US009628597B1

(12) United States Patent
Andersen et al.

(10) Patent No.: US 9,628,597 B1
(45) Date of Patent: Apr. 18, 2017

(54) DOCKING STATION FOR MOBILE COMPUTING DEVICES

(71) Applicant: Cisco Technology, Inc., San Jose, CA (US)

(72) Inventors: Cathrine Werthwein Andersen, San Francisco, CA (US); David Bjerrum Reeckmann, San Francisco, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 14/992,621

(22) Filed: Jan. 11, 2016

Related U.S. Application Data

(60) Provisional application No. 62/263,083, filed on Dec. 4, 2015.

(51) Int. Cl.
  *H04M 1/04* (2006.01)
  *H04N 7/15* (2006.01)
  *G06F 13/40* (2006.01)
  *G06F 1/16* (2006.01)

(52) U.S. Cl.
  CPC ............ *H04M 1/04* (2013.01); *G06F 1/1632* (2013.01); *G06F 13/4081* (2013.01); *H04N 7/15* (2013.01)

(58) Field of Classification Search
  CPC ...................................... H04M 1/04
  USPC ............... 348/14.08; 361/679.01, 679.41; 381/337, 340; 455/557, 569.1, 456.3; 506/39; 705/26.5; 710/17, 304; 726/2; 5/600; 700/83
  See application file for complete search history.

(56) References Cited

U.S. PATENT DOCUMENTS

| | | | |
|---|---|---|---|
| 5,889,671 A * | 3/1999 | Autermann | A01B 79/005 361/724 |
| 6,978,499 B2 * | 12/2005 | Gallant | A61G 1/00 5/507.1 |
| 8,520,370 B2 | 8/2013 | Waitzman, III et al. | |
| 8,738,080 B2 | 5/2014 | Nhiayi | |
| 8,860,774 B1 | 10/2014 | Sheeley et al. | |

(Continued)

OTHER PUBLICATIONS

Eichen, Elliot, et al., "Smartphone Docking Stations and Strongly Converged VoIP Clients for Fixed-Mobile convergence," IEEE Wireless Communications and Networking Conference: Services, Applications and Business, 2012, pp. 3140-3144.

(Continued)

*Primary Examiner* — Gerald Gauthier
(74) *Attorney, Agent, or Firm* — Polsinelli PC

(57) ABSTRACT

A docking station can comprise a body component configured to receive a mobile computing device such that a display of the mobile computing device is presented outward from the body component. An acoustic audio enhancement horn can be positioned inside of the body component and include an internal opening and an external opening. The internal opening can receive audio from a speaker of the mobile computing device, which is enhanced by the acoustic audio enhancement horn and then outputted through the external opening. The docking station can also include a camera lens mounting element that is coupled to the body component and is configured to receive an external camera lens and align the external camera lens with a camera lens of the mobile computing device such that the camera lens of the mobile computing device can capture image data through the external camera lens.

20 Claims, 12 Drawing Sheets

(56) References Cited

U.S. PATENT DOCUMENTS

| | | | |
|---|---|---|---|
| 9,075,572 B2 | 7/2015 | Ayoub et al. | |
| 9,258,033 B2* | 2/2016 | Showering | H04B 5/0031 |
| 2006/0084471 A1* | 4/2006 | Walter | H04M 1/723 |
| | | | 455/557 |
| 2008/0278894 A1* | 11/2008 | Chen | G06F 1/1632 |
| | | | 361/679.01 |
| 2010/0077109 A1* | 3/2010 | Yan | H04L 43/0811 |
| | | | 710/17 |
| 2010/0183179 A1* | 7/2010 | Griffin, Jr. | H04R 1/2857 |
| | | | 381/337 |
| 2010/0250817 A1* | 9/2010 | Collopy | G06F 1/1624 |
| | | | 710/304 |
| 2011/0230209 A1* | 9/2011 | Kilian | H04M 1/72569 |
| | | | 455/456.3 |
| 2012/0140970 A1* | 6/2012 | Kim | H04R 1/30 |
| | | | 381/340 |
| 2012/0303476 A1* | 11/2012 | Krzyzanowski | G06F 8/60 |
| | | | 705/26.5 |
| 2013/0086633 A1* | 4/2013 | Schultz | H04L 9/00 |
| | | | 726/2 |
| 2013/0210496 A1* | 8/2013 | Zakarias | H04M 1/6033 |
| | | | 455/569.1 |
| 2013/0252669 A1* | 9/2013 | Nhiayi | H04M 1/72527 |
| | | | 455/557 |
| 2014/0296112 A1* | 10/2014 | O'Driscoll | G01J 3/0202 |
| | | | 506/39 |
| 2015/0070835 A1* | 3/2015 | Mclean | G06F 1/1632 |
| | | | 361/679.41 |
| 2016/0266609 A1* | 9/2016 | McCracken | G06F 1/1632 |

OTHER PUBLICATIONS

GoiPhone, "AirCurve Acoustic Amplifier Now Available for iPhone 4," http://www.igoiphone.com/aircurve-acoustic-amplifier-now-available-for-iphone-4/; accessed Jan. 11, 2016.

Action Life Media, "mCAMLITE," http://www.actionlifemedia.com/mcamlite; accessed Jan. 11, 2016.

* cited by examiner

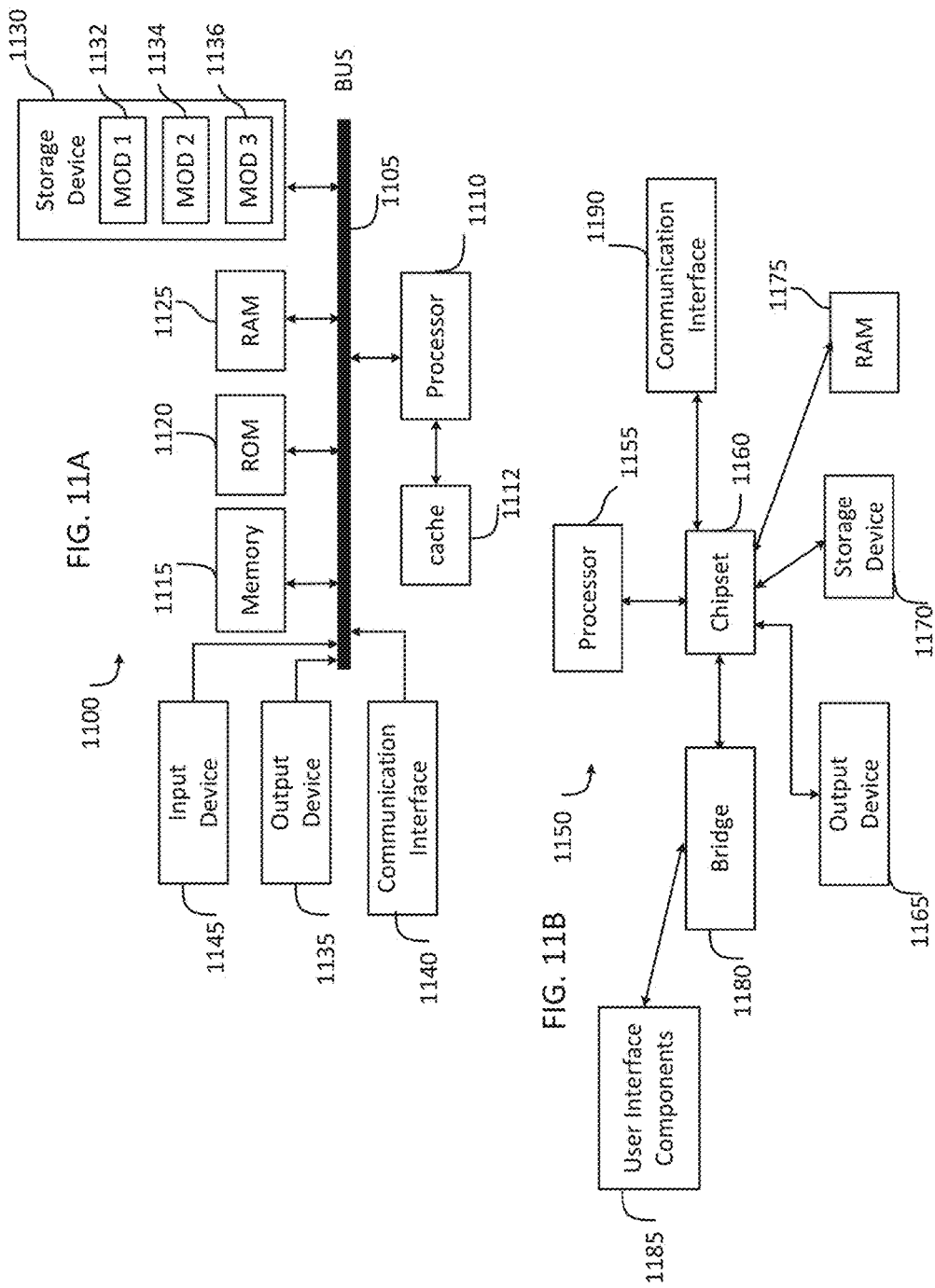

DOCKING STATION FOR MOBILE COMPUTING DEVICES

CROSS REFERENCE TO RELATED APPLICATIONS

This application claims the benefit of U.S. Provisional Application No. 62/263,083 titled AUDIO AND VISUAL ENHANCEMENT DOCKING STATION FOR MOBILE COMPUTING DEVICES" filed on Dec. 4, 2015, which is hereby expressly incorporated by reference in its entirety.

TECHNICAL FIELD

The present technology relates in general to docking stations, and more specifically to a docking station providing an enhanced teleconference experience.

BACKGROUND

Modern networked computing devices allow users to communicate with each other virtually via teleconferences. For example, many computing devices are equipped with a display, camera and microphone that enable users to capture and share sound and video with one another in real time. Teleconference specific computing devices that are designed with this functionality in mind provide a quality teleconference experience, but also come with a high price tag and are not well suited for other tasks. Common multi-purpose mobile computing devices can be used to for a teleconference, but are often not designed with this feature as the primary focus and therefore provide a lower overall experience. For example, mobile phones provide a relatively low sound volume and are equipped with a camera meant primarily to take pictures rather than facilitate a video conference. Accordingly, improvements are needed.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only examples of the disclosure and are not therefore to be considered to be limiting of its scope, the principles herein are described and explained with additional specificity and detail through the use of the accompanying drawings in which:

FIGS. 11A and 11B illustrate exemplary possible system embodiments.

DESCRIPTION OF EXAMPLE EMBODIMENTS

Figure 1A:
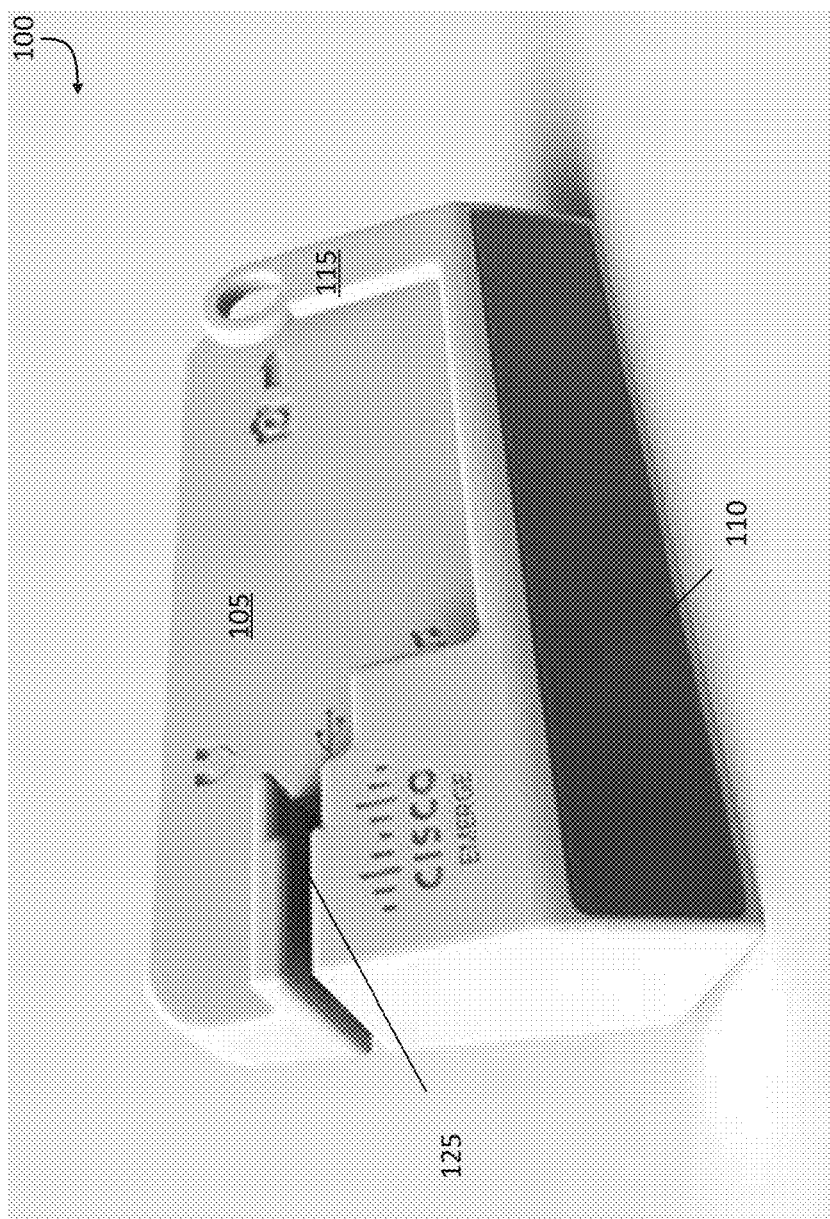
FIGS. 1A and 1B show examples of a docking station configured to provide an enhanced teleconference experience.
Figure 1B:

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.
Overview:

Disclosed is a docking station comprising a body component, an acoustic audio enhancement horn and a camera lens mounting element. The body component can be configured to receive a mobile computing device such that, once the mobile computing device is received by the body component, a display of the mobile computing device is presented outward from the body component. The acoustic audio enhancement horn can be positioned inside of the body component and include an internal opening and an external opening, the internal opening configured to receive audio from a speaker of the mobile computing device, which is enhanced by the acoustic audio enhancement horn and then outputted through the external opening. The speaker of the mobile computing device can be aligned with the internal opening of the acoustic audio enhancement horn when the mobile computing device is received by the body component. The camera lens mounting element can be coupled to the body component and configured receive an external camera lens and align the external camera lens with a camera lens of the mobile computing device such that the camera lens of the mobile computing device can capture image data through the external camera lens.
Detailed Description:

FIGS. 1A and 1B illustrate examples of a docking station 100 configured to provide an enhanced teleconference experience. As shown in FIG. 1A, a docking station 100 can include a body component 105 configured to receive a mobile computing device.

A mobile computing device can be any type of computing device designed to be mobile (e.g., not required to be physically connected to an external power source), such as a mobile smart phone, tablet PC, laptop, etc. For example, a mobile computing device can include some or all of the features, components, and peripherals of computing device 1100 of FIGS. 11A and 11B.

Receiving a mobile computing device can include affixing the mobile computing device to the docking station such that the mobile computing device will remain in a desired position. The body component 105 can include an opening and guides that are designed to receive the mobile computing device and hold the mobile computing device in a desired position with the display presented outward from the body component 105 to facilitate the teleconference.

The body component 105 can also include a base portion that supports the docking station 100 and keeps the docking station 100 in a desired configuration when set on a level surface. This can allow a user to affix a mobile computing device to the docking station 100 and set the docking station 100 on a table or other surface to conduct a hands free teleconference.

The body component 105 can be configured to position the mobile computing device at an angle that is suited to conduct a teleconference. As shown, body component 105 is designed to hold a mobile computing device at an upward angle. This can allow a user to easily view the display of the mobile computing device while the docking station 100 is resting on a table and positioned lower than the user's head.

While the body component 105 shown in FIG. 1A is designed to receive and hold a mobile computing device in a single fixed position, in other embodiments, the body component 105 can be adjustable to allow a user reconfigure the docking station 105 to change the position of the mobile computing device in relation to the user. For example, the body component 105 can be adjustable to allow a user to tilt the body component 105 in relation to the base of the body component 105 to change the angle at which the display of the mobile computing device is presented while affixed to the docking station 100. This can allow a user to adjust the display of the mobile computing device based on the user's height and positioning while conducting a teleconference meeting.

The docking station 100 can include an acoustic audio enhancement horn 110 that is configured to enhance, amplify and/or otherwise alter audio that is output by a speaker of the mobile computing device during a teleconference. The acoustic audio enhancement horn 110 can be positioned and/or built within the body component 105. The acoustic audio enhancement horn 110 can include an internal opening positioned to align with the speaker of the mobile computing device when the mobile computing device is affixed to the docking station 100. This can allow audio that is output by the speaker of the mobile computing device to enter the acoustic audio enhancement horn 110 through the internal opening.

The audio can then travel through the acoustic audio enhancement horn 110 and exit through an external opening of the acoustic audio enhancement horn 110. The external opening can be positioned on the outside of the body component 105 to provide the audio to the user. As shown, the external opening is positioned at the front of the body component 105 to provide audio directly to a user facing the docking station 100 during a teleconference.

The acoustic audio enhancement horn 110 can enhance and/or amplify the audio output by the mobile computing device during a teleconference. For example the acoustic audio enhancement horn 110 can increase in size from the internal opening to the external opening, thereby naturally amplifying the volume of the audio as it travels through the acoustic audio enhancement horn 110. Alternatively, the acoustic audio enhancement horn can simply redirect sound from the speaker in the direction of the user. In this type of scenario, the acoustic audio enhancement horn 110 may not amplify the sound, but rather just redirect it to make it easier for a user to hear during a teleconference.

The docking station 100 can also include a camera lens mounting element 115 that is coupled to the body component 105. As shown, the camera lens mounting element 115 is designed as a continuous piece with the body component 105. In some embodiments, however, the camera lens mounting element 115 can be a separate piece that has been affixed to the body component 105.

The camera lens mounting element 115 can be configured to receive an external camera lens. For example, the camera lens mounting element 115 can be designed to allow an external camera lens to snap, screw, or otherwise be affixed to the camera lens mounting element 115. The external camera lens can be any type of camera lens, such as a wide angle lens, zoom lens, etc., that is designed and/or appropriately sized to be affixed to the camera lens mounting element. FIG. 1B illustrates the docking station 100 with an external camera lens 120 attached to the camera lens mounting element 115.

Returning to the discussion of FIG. 1A, after the external camera lens is affixed to the camera lens mounting element 115, the camera lens mounting element 115 can hold the external camera lens in a position such that the external camera lens is aligned with a camera lens of the mobile computing device when the mobile computing device is affixed to the docking station 100. This can allow the camera lens of the mobile computing device to capture image data through the external camera lens, thereby enhancing the video captured by the mobile computing device during a teleconference. For example, if the external lens is a wide angle lens, the image data captured by the camera lens of the mobile computing device through the external lens will also be wide angle, thereby providing the mobile computing device with a wider angle view than would be available with the camera lens of the mobile computing device alone.

As shown, the camera lens mounting element 115 is fixed to the body element 103 such that its position cannot be adjusted. Accordingly, in this type of embodiment, the docking station 100 is specifically design for mobile computing devices that are a specified size and/or have the camera placed in a specific location.

In some embodiments, however, the camera lens mounting element 115 can be adjustable to allow a user to change the position of the external camera lens and align the external camera lens with the camera lens of the mobile computing device. For example, the camera lens mounting element 115 can include or be affixed to the body component via slider that allows a user to adjust the position of the external camera lens. This can allow the docking station 100 to be used for mobile computing devices of various sizes and with cameras positioned at different places on the mobile computing device.

The camera lens mounting element 115 can be configured to receive multiple types of external camera lenses. This can allow a user to affix the appropriate external camera lens to the docking station 100 for the user's specified use and/or existing conditions. For example, the user can affix a zoom lens to capture distant images or provide a zoom. Alternatively, a user can use a wide angle lens to capture a group of people or when the user is near the lens.

The docking station 100 can further include an opening 125 through the body component 105 that can allow a power cord to be connected to a mobile computing device while the mobile computing device is affixed to the docking station 100. For example, the opening 100 can be aligned with a power connector port of the mobile computing device, thereby allowing a user to plug a power cord into the mobile computing device to provide power while the user is conducting a teleconference meeting. It should be noted that the power cord would only provide power to the mobile computing device and that the docking station 100 itself does not require power to enhance the audio and video of the mobile computing device. Alternatively, in some embodiments, the docking station 100 can be designed to include a battery that can be used to power or charge a mobile computing device.

In some embodiments, the docking station 100 can be designed to be portable or easily transported or carried by a user. For example, the docking station 100 can include a handle affixed to the body component 105 or made out of the body component 105 that allows a user to easily carry the docking station. Alternatively, in some embodiments, the docking station 100 can be designed to be disassembled into smaller pieces. For example, the body component 105 can be designed to be disassembled into two or more parts that are easier to carry. As another example, the camera lens mounting element 115 can be designed to be detached from the body component 105. Alternatively, the body component 105 can be designed to be folded or collapsed into a smaller size for travel.

Figure 2:
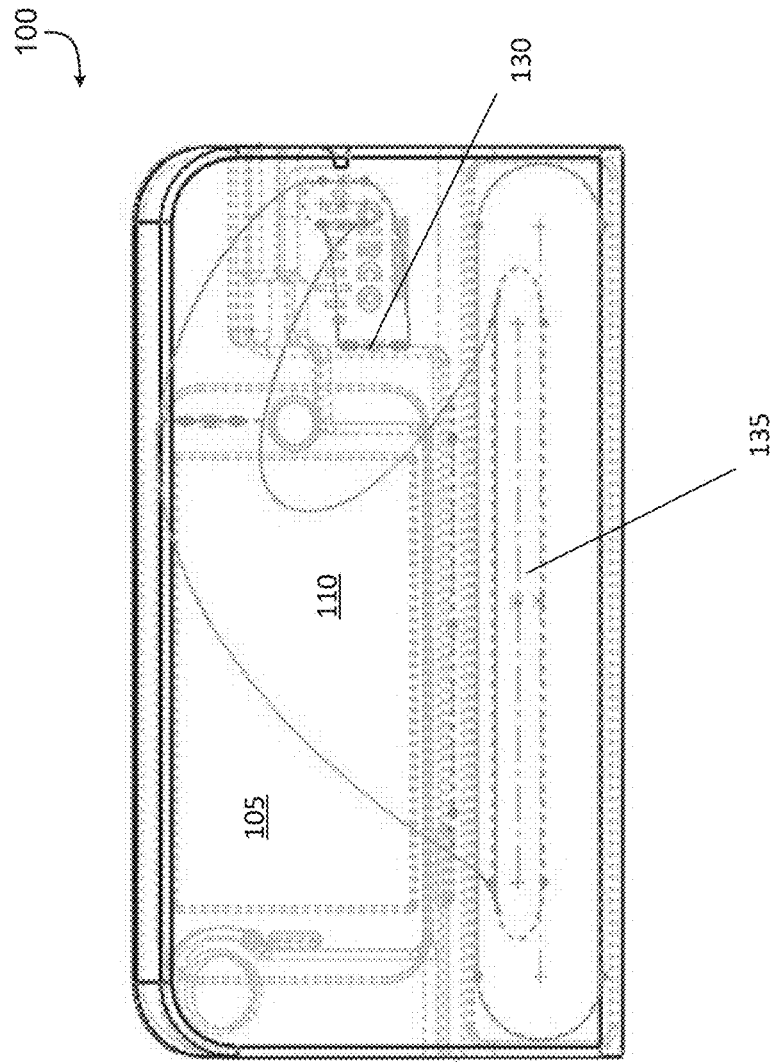
FIG. 2 shows an example rear view of a docking station.

FIG. 2 shows an example rear view of a docking station 100. As shown, an acoustic audio enhancement horn 110 can be built into a body component 105. The acoustic audio enhancement horn 110 can include an internal opening 130 and an external opening 135. The internal opening 130 can be positioned to align with a speaker of a mobile computing device when the mobile computing device is affixed to the docking station 100. This can allow for sound output from the speaker of the mobile computing device to enter the acoustic audio enhancement horn 110 through the internal opening 130. As shown, the size of the acoustic audio enhancement horn 110 gets larger from the internal opening 130 to the external opening 135. This increase is size can naturally amplify the volume of sound travelling through the acoustic audio enhancement horn 110 from the internal opening 130 to external opening 135.

Figure 3:
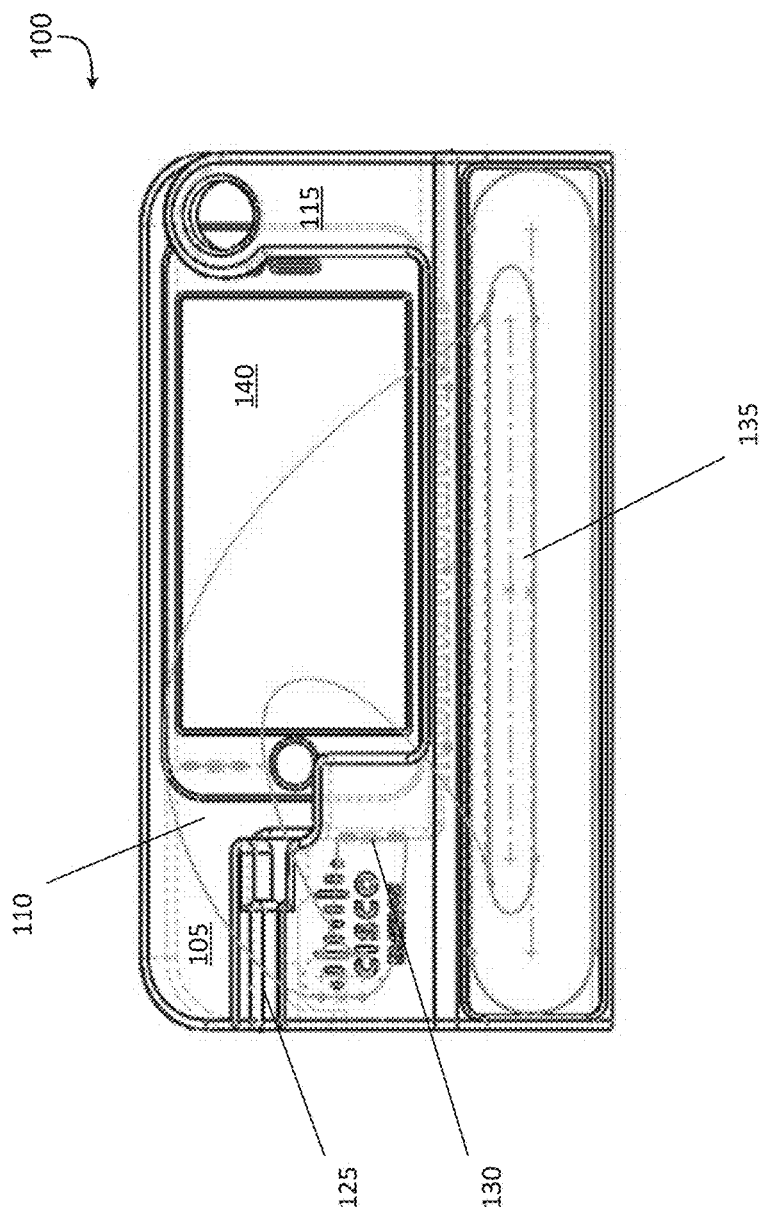
FIG. 3 shows an example front view of a docking station.

FIG. 3 shows an example front view of a docking station 110. The docking station 100 can be configured to receive a mobile computing device 140. For example the body component 105 of the docking station 100 can be designed to allow a mobile computing device 140 to be affixed to the docking station 100. As shown, the docking station 100 can include a camera lens mounting element 115 that is positioned outside of the mobile computing device 140 when the mobile computing device is affixed to the docking station 100. This can help also maintain the mobile computing device 140 in a desired position when the mobile computing device 140 is affixed to the docking station 100.

The camera lens mounting element 115 can be configured to receive an external camera lens, which can be aligned with a camera lens of the mobile computing device 140. This can allow the camera lens of the mobile computing device 140 to capture video through the external camera lens.

As shown, an acoustic audio enhancement horn 110 can built into the body component 105. The docking station 100 can be designed such that when a mobile computing device 140 is affixed to the docking station 100, a speaker of the mobile computing device 140 is aligned with an internal opening 130 of the docking station 100. This can allow sound output by the speaker to enter the acoustic audio enhancement horn 110, where it can be naturally magnified.

The docking station 100 can also include an opening 125 that allows a power cord to be connected to a mobile computing device 140 while the mobile computing device 140 is affixed to the docking station. This can allow a user to power the mobile computing device 140 while conducting a teleconference.

Figure 4:
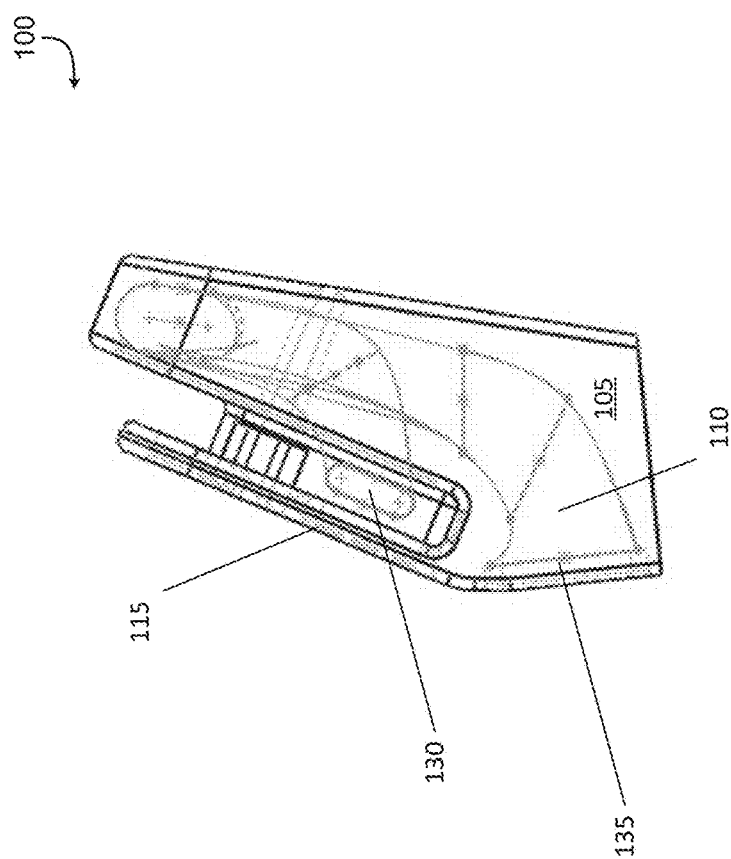
FIG. 4 shows an example right view of a docking station.

FIG. 4 shows an example right view of a docking station 100. As shown, an acoustic audio enhancement horn 110 can be built into a body component 105. The docking station 105 can include a camera lens mounting element 115 that can be used to affix a mobile computing device 140 to the body component 105 of the docking station. For example, as shown, the camera lens mounting element 115 can be positioned a distance away from the body component 105 to allow a mobile computing device to be positioned between the camera lens mounting element 115 and the body component 105.

An internal opening 130 of an acoustic audio enhancement horn 110 can be positioned to align with a speaker of a mobile computing device 140 when the mobile computing device 140 is affixed to the docking station 100. This can allow sound output by the speaker to enter the acoustic audio enhancement horn 110, where it can be naturally magnified.

Figure 5:
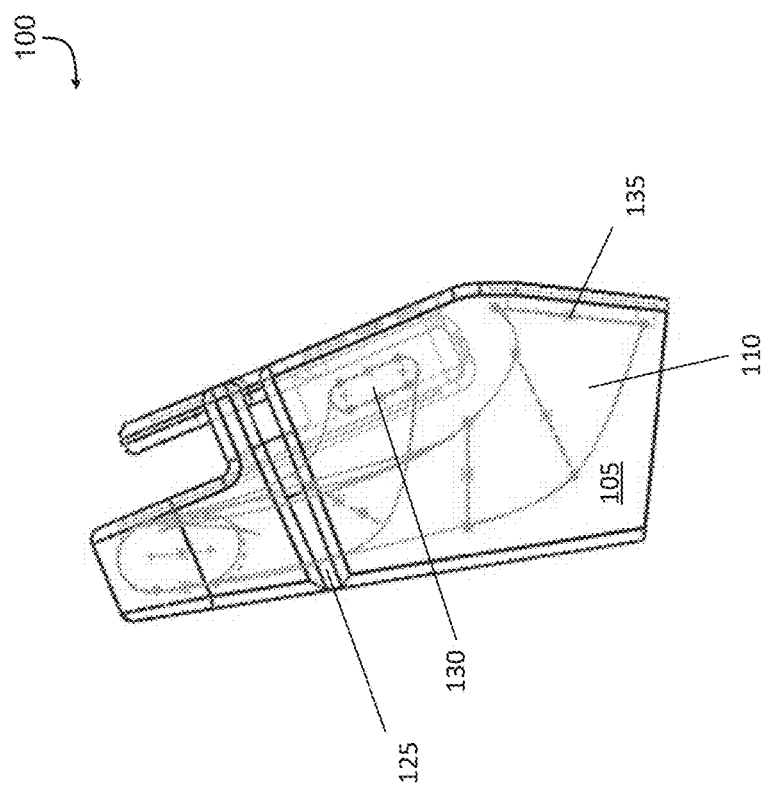
FIG. 5 shows an example left view of a docking station.

FIG. 5 shows an example left view of a docking station 100. As shown, an acoustic audio enhancement horn 110 can be built into a body component 105. The acoustic audio enhancement horn 110 can include an internal 140 when the mobile computing device 140 is affixed to the docking station 100. This can allow sound output by the speaker to enter the acoustic audio enhancement horn 110, where it can be naturally magnified.

The docking station 100 can also include an opening 125 that allows a power cord to be connected to a mobile computing device 140 while the mobile computing device 140 is affixed to the docking station 100. This can allow a user to power the mobile computing device 140 while conducting a teleconference.

Figure 6:
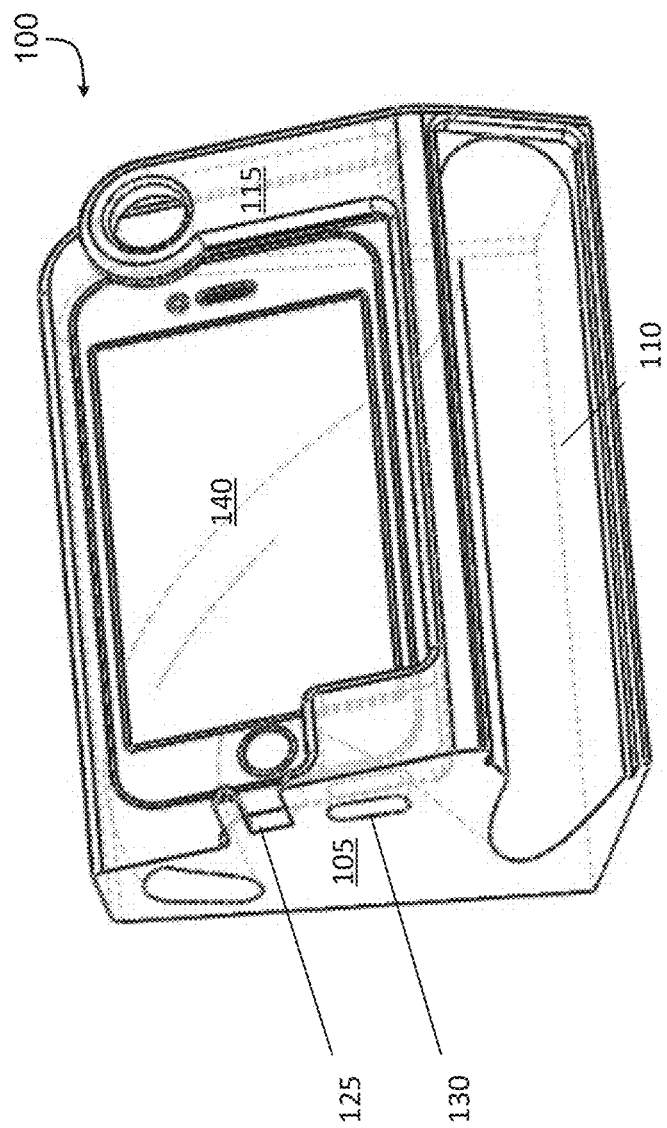
FIG. 6 shows an example cut view of a docking station.

FIG. 6 shows an example cut view of a docking station. As shown, an acoustic audio enhancement horn 110 can be built into a body component 105. The acoustic audio enhancement horn 110 can include an internal opening 130 that is positioned to align with a speaker of a mobile computing device when the mobile computing device is affixed to the docking station 100. This can allow sound output by the speaker to enter the acoustic audio enhancement horn 110, where it can be naturally magnified.

As shown, the docking station 100 can include a camera lens mounting element 115 that is positioned a distance away from the body component 10*t* to allow a mobile computing device 140 to be affixed to be placed between the camera lens mounting element 114 and the body component. This can help maintain the mobile computing device 140 in a desired position when the mobile computing device 140 is affixed to the docking station 100.

The camera lens mounting element 115 can be configured to receive an external camera lens, which can be aligned with a camera lens of the mobile computing device 140. This can allow the camera of the mobile computing device to capture video through the external camera lens.

The docking station 100 can also include an opening 125 that allows a power cord to be connected to a mobile computing device 140 while the mobile computing device 140 is affixed to the docking station. This can allow a user to power the mobile computing device 140 while conducting a teleconference.

Figure 7:
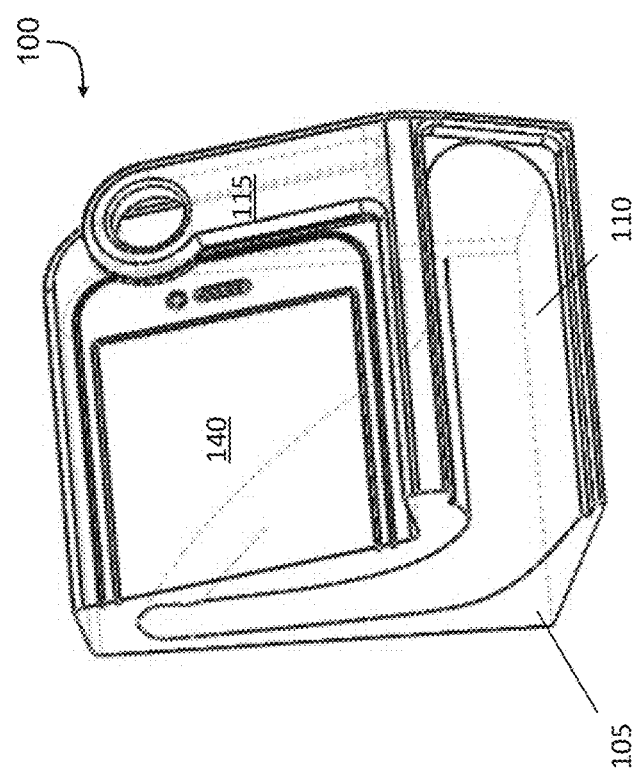
FIG. 7 shows another example cut view of a docking station.

FIG. 7 shows another example cut view of a docking station 100. As shown, an acoustic audio enhancement horn 110 can be built into a body component 105. The docking station 100 can include a camera lens mounting element 115 that is positioned a distance away from the body component 105 to allow a mobile computing device 140 to be affixed to the docking station 100 between the camera lens mounting element 115 and the body component 105. This can maintain the mobile computing device 140 in a desired position while the mobile computing device 140 is affixed to the docking station 100.

The camera lens mounting element 115 can be configured to receive an external camera lens, which can be aligned with a camera lens of the mobile computing device 140. This can allow the camera of the mobile computing device to capture video through an external camera lens.

Figure 8:
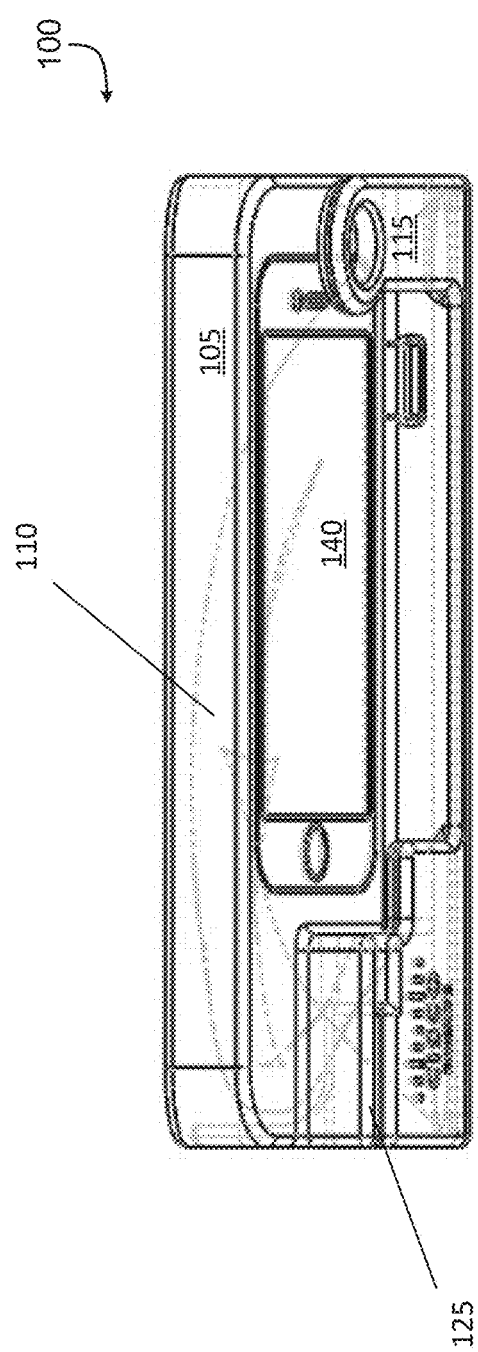
FIG. 8 shows an example top view of a docking station.

FIG. 8 shows an example top view of a docking station 100. As shown, an acoustic audio enhancement horn 110 can be built into a body component 105. The docking station 100 can include a camera lens mounting element 115 that is positioned a distance away from the body component 105 to allow a mobile computing device 140 to be affixed to the docking station 100 between the camera lens mounting element 115 and the body component 105. This can maintain the mobile computing device 140 in a desired position while the mobile computing device 140 is affixed to the docking station 100.

The camera lens mounting element 115 can be configured to receive an external camera lens, which can be aligned with a camera lens of the mobile computing device 140. This can allow the camera of the mobile computing device to capture video through the external camera lens.

The docking station 100 can also include an opening 125 that allows a power cord to be connected to a mobile computing device 140 while the mobile computing device 140 is affixed to the docking station. This can allow a user to power the mobile computing device 140 while conducting a teleconference.

Figure 9:
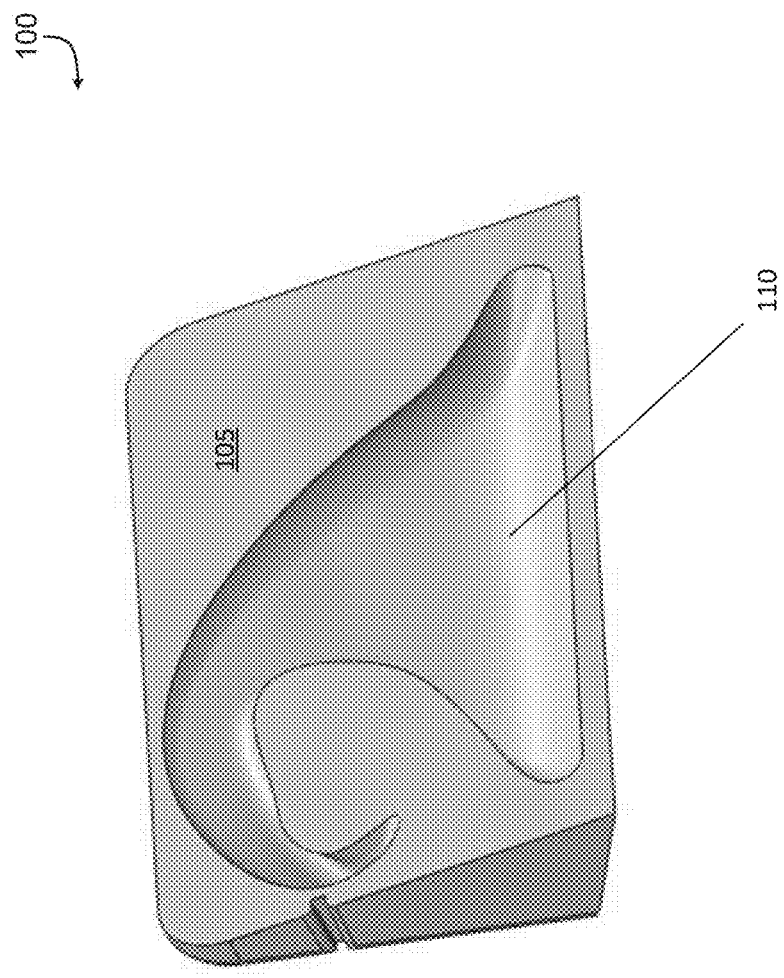
FIG. 9 shows another example cut view of a docking station.

FIG. 9 shows another example cut view of a docking station. As shown, an acoustic audio enhancement horn 110 is built into a body component 105. As shown, the size of the acoustic audio enhancement horn 110 can be designed to increase in size from an internal opening to an external opening to naturally amplify sound as it travels through the acoustic audio enhancement horn 110.

Figure 10:
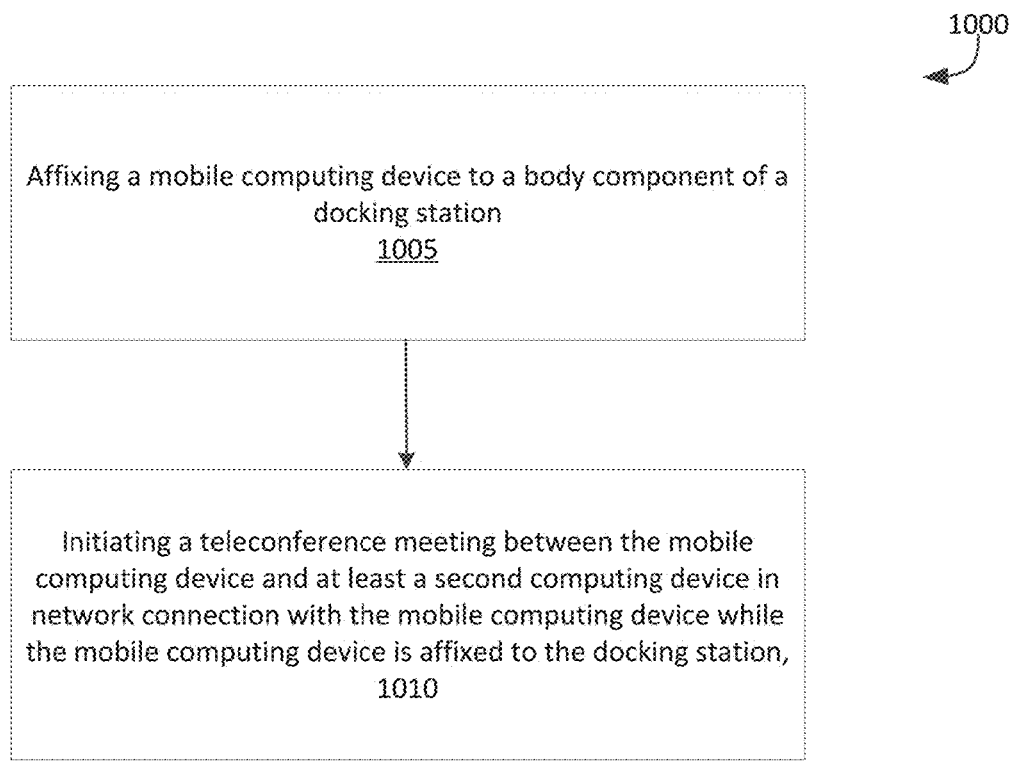
FIG. 10 shows an example method 1000 of using a docking station to enhance a teleconference.

FIG. 10 shows an example method 1000 of using a docking station to enhance a teleconference. At step 1005, a user can affix a mobile computing device to a body component of a docking station. The docking station can be designed such that affixing the mobile computing device to the docking station results in a display of the mobile computing device being presented outward from the body component, a speaker of the mobile computing device being aligned with an internal opening of an acoustic audio enhancement horn of the docking station, and a camera lens of the mobile computing device being aligned with an external camera lens coupled to a camera lens mounting element of the docking station.

At step 1010, the user can initiate a teleconference meeting between the mobile computing device and at least a second computing device in network connection with the mobile computing device, while the mobile computing device is affixed to the docking station. This can cause the camera lens of the mobile computing device to capture image data through the external camera lens coupled to the camera lens mounting element. The captured image data can then be transmitted by the mobile computing device to the second computing device. Further audio data received by the mobile computing device from the second computing device can be outputted through a speaker of the mobile computing device into the internal opening and enhanced by the acoustic audio enhancement horn. For example, the acoustic audio enhancement horn can naturally amplify the sound.

FIG. 11A, and FIG. 11B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 11A illustrates a conventional system bus computing system architecture 1100 wherein the components of the system are in electrical communication with each other using a bus 1105. Exemplary system 1100 includes a processing unit (CPU or processor) 1110 and a system bus 1105 that couples various system components including the system memory 1115, such as read only memory (ROM) 1120 and random access memory (RAM) 1125, to the processor 1110. The system 1100 can include a cache of high-speed memory connected directly with, in close proximity to, or integrated as part of the processor 1110. The system 1100 can copy data from the memory 1115 and/or the storage device 1130 to the cache 1112 for quick access by the processor 1110. In this way, the cache can provide a performance boost that avoids processor 1110 delays while waiting for data. These and other modules can control or be configured to control the processor 1110 to perform various actions. Other system memory 1115 may be available for use as well. The memory 1115 can include multiple different types of memory with different performance characteristics. The processor 1110 can include any general purpose processor and a hardware module or software module, such as module 1 1132, module 2 1134, and module 3 1136 stored in storage device 1130, configured to control the processor 1110 as well as a special-purpose processor where software instructions are incorporated into the actual processor design. The processor 1110 may essentially be a completely self-contained computing system, containing multiple cores or processors, a bus, memory controller, cache, etc. A multi-core processor may be symmetric or asymmetric.

To enable user interaction with the computing device 1100, an input device 1145 can represent any number of input mechanisms, such as a microphone for speech, a touch-sensitive screen for gesture or graphical input, keyboard, mouse, motion input, speech and so forth. An output device 1135 can also be one or more of a number of output mechanisms known to those of skill in the art. In some instances, multimodal systems can enable a user to provide multiple types of input to communicate with the computing device 1100. The communications interface 1140 can generally govern and manage the user input and system output. There is no restriction on operating on any particular hardware arrangement and therefore the basic features here may easily be substituted for improved hardware or firmware arrangements as they are developed.

Storage device 1130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1125, read only memory (ROM) 1120, and hybrids thereof.

The storage device 1130 can include software modules 1132, 1134, 236 for controlling the processor 1110. Other hardware or software modules are contemplated. The storage device 1130 can be connected to the system bus 1105. In one aspect, a hardware module that performs a particular function can include the software component stored in a computer-readable medium in connection with the necessary hardware components, such as the processor 1110, bus 1105, display 1135, and so forth, to carry out the function.

FIG. 11B illustrates a computer system 1150 having a chipset architecture that can be used in executing the described method and generating and displaying a graphical user interface (GUI). Computer system 1150 is an example of computer hardware, software, and firmware that can be used to implement the disclosed technology. System 1150 can include a processor 1155, representative of any number of physically and/or logically distinct resources capable of executing software, firmware, and hardware configured to perform identified computations. Processor 1155 can communicate with a chipset 1160 that can control input to and output from processor 1155. In this example, chipset 1160 outputs information to output 1165, such as a display, and can read and write information to storage device 1170, which can include magnetic media, and solid state media, for example. Chipset 1160 can also read data from and write data to RAM 1175. A bridge 1180 for interfacing with a variety of user interface components 1185 can be provided for interfacing with chipset 1160. Such user interface components 1185 can include a keyboard, a microphone, touch detection and processing circuitry, a pointing device, such as a mouse, and so on. In general, inputs to system 1150 can come from any of a variety of sources, machine generated and/or human generated.

Chipset 1160 can also interface with one or more communication interfaces 1190 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1155 analyzing data stored in storage 1170 or 1175. Further, the machine can receive inputs from a user via user interface components 1185 and execute appropriate functions, such as browsing functions by interpreting these inputs using processor 1155.

It can be appreciated that exemplary systems 1100 and 1150 can have more than one processor 1110 or be part of a group or cluster of computing devices networked together to provide greater processing capability.

As one of ordinary skill in the art will readily recognize, the examples and technologies provided above are simply for clarity and explanation purposes, and can include many additional concepts and variations.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

For clarity of explanation, in some instances the present technology may be presented as including individual functional blocks including functional blocks comprising devices, device components, steps or routines in a method embodied in software, or combinations of hardware and software.

Note that in certain example implementations, the optimization and/or placement functions outlined herein may be implemented by logic encoded in one or more tangible, non-transitory media (e.g., embedded logic provided in an application specific integrated circuit [ASIC], digital signal processor [DSP] instructions, software [potentially inclusive of object code and source code] to be executed by a processor, or other similar machine, etc.). The computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

We claim:

1. A docking station comprising:
a body component configured to receive a mobile computing device such that, once the mobile computing device is received by the body component, a display of the mobile computing device is substantially coplanar with a front portion of the body component such that the display is presented towards a user of the docking station;
an acoustic audio enhancement horn positioned inside of the body component, the acoustic audio enhancement horn including an internal opening configured to align with and receive audio from a speaker of the mobile computing device and an external opening substantially coplanar with a front portion of the body component and configured to output audio towards the user wherein the received audio is enhanced by the acoustic audio enhancement horn and then outputted through the external opening towards the user; and
a camera lens mounting element coupled to the body component, the camera lens mounting element configured to receive an external camera lens and align the external camera lens with a camera lens of the mobile computing device such that the camera lens of the mobile computing device can capture image data through the external camera lens.

2. The docking station of claim 1, wherein the body component can be adjusted from a first configuration to a second configuration, causing a change to an angle at which the display of the mobile computing device is presented outward.

3. The docking station of claim 1, wherein the camera lens mounting unit is coupled to the body component at a fixed position such that the camera lens of the mobile computing device is aligned with the external camera lens when the mobile computing device is received by the body component.

4. The docking station of claim 1, wherein a position at which the camera lens mounting unit is positioned in relation to the body component can be changed to align the external camera lens with the camera lens of the mobile computing device.

5. The docking station of claim 1, further comprising an opening through the body component that allows a power cord to be connected to the mobile computing device when the mobile computing device is received by the body component.

6. The docking station of claim 1, wherein the internal opening is smaller than the external opening and a circumference of the acoustic audio enhancement horn increases in size from the internal opening to the external opening.

7. The docking station of claim 1, wherein the acoustic audio enhancement horn is built out of the body component.

8. A teleconference system comprising:
a docking station comprising a body component, an acoustic audio enhancement horn and a camera lens mounting element;
an external camera lens coupled to the camera lens mounting element; and
a mobile computing device detachably affixed to the body component such that:
a display of the mobile computing device is substantially coplanar with a front portion of the body component such that the display is presented towards a user of the teleconference system,
a speaker of the mobile computing device is aligned with an internal opening of the acoustic audio enhancement horn such that the acoustic audio enhancement horn receives audio from the speaker, enhances the audio, and outputs the audio towards the user through an external opening of the acoustic audio enhancement horn that is substantially coplanar with a front portion of the body component, and
a camera lens of the mobile computing device is aligned with the external camera lens such that the camera lens of the mobile computing device can capture image data through the external camera lens.

9. The teleconference system of claim 8, wherein the body component can be adjusted from a first configuration to a second configuration, causing a change to an angle at which the display of the mobile computing device is presented outward.

10. The teleconference system of claim 8, wherein the camera lens mounting unit is coupled to the body component at a fixed position.

11. The teleconference system of claim 8, wherein a position at which the camera lens mounting unit is positioned in relation to the body component can be adjusted to align the external camera lens with the camera lens of the mobile computing device.

12. The teleconference system of claim 8, wherein the docking station further comprises an opening through the body component that allows a power cord to be connected to the mobile computing device.

13. The teleconference system of claim 8, wherein the internal opening is smaller than the external opening and a circumference of the acoustic audio enhancement horn increases in size from the internal opening to the external opening.

14. The teleconference system of claim 8, wherein the acoustic audio enhancement horn is built out of the body component.

15. A docking station comprising:
a base portion;

a docking portion for receiving a mobile computing device, the docking portion comprising:
a back face;
a receiving platform extending from the back face; and
an affixing element extending from the receiving platform, whereby the affixing element can secure a mobile computing device in a first affixed position against one or more of the receiving platform and the back face without obscuring a display of the mobile computing device;
a camera lens mounting element coupled to the affixing element, wherein the camera lens mounting element can receive an external camera lens and align the external camera lens with a camera lens of the mobile computing device;
an acoustic audio enhancement horn comprising:
one or more internal openings located within an interior of the docking portion, whereby the one or more internal openings can receive audio from one or more speakers of the mobile computing device;
an external opening coupled to the internal opening, wherein the external opening is coplanar with one or more of a front face of the base portion and a front face of the docking portion.

16. The docking station of claim 15, wherein the one or more internal openings are each smaller in size than the external opening, and a circumference of the acoustic audio enhancement horn increases in size from the internal opening to the external opening.

17. The docking station of claim 15, further comprising an adjustment mechanism coupled between the base portion and the docking portion, whereby the adjustment mechanism can adjust the mobile computing device between the first affixed position and a second affixed position.

18. The docking station of claim 15, wherein the camera lens mounting element is integrally formed with the affixing element.

19. The docking station of claim 15, wherein the docking portion further comprises a power supply opening that allows a power cord to be connected to the mobile computing device.

20. The docking station of claim 15, wherein the receiving platform is perpendicular to one or more of the back face and the affixing element.

* * * * *